United States Patent [19]
Ponsioen

[11] Patent Number: 5,811,734
[45] Date of Patent: Sep. 22, 1998

[54] BUS-BAR CONDUCTOR SYSTEM FOR HIGH VOLTAGE SYSTEMS

[75] Inventor: Ysbrand Paul Jozef Maria Ponsioen, KL Alphen a/d Rijn, Netherlands

[73] Assignee: Holec Systemen en Componenten B.V., Hengelo, Netherlands

[21] Appl. No.: 65,895

[22] Filed: May 25, 1993

[30] Foreign Application Priority Data

May 29, 1992 [NL] Netherlands ............................ 9200950

[51] Int. Cl.⁶ .................................................. H02G 5/06
[52] U.S. Cl. ...................................... 174/99 B; 174/68.2
[58] Field of Search ................................ 174/99 B, 68.2, 174/16.2, 27, 28, 29, 129 B, 99 R

[56] References Cited

U.S. PATENT DOCUMENTS

| | | | |
|---|---|---|---|
| 2,469,073 | 5/1949 | McArthur et al. | 174/99 E |
| 2,599,857 | 6/1952 | Mildner | 174/29 X |
| 2,815,396 | 12/1957 | Bartlett | 174/99 B |
| 2,877,289 | 3/1959 | Schymik | 174/99 B |
| 2,973,405 | 2/1961 | Zuch et al. | 174/99 B |
| 3,170,030 | 2/1965 | Beck et al. | 174/99 B |
| 4,163,118 | 7/1979 | Mariën et al. | 174/99 B |

FOREIGN PATENT DOCUMENTS

| | | |
|---|---|---|
| 535242 | 10/1931 | Germany. |
| 3119915 | 3/1982 | Germany. |
| 0460896 | 10/1968 | Switzerland ............ 174/99 B |

*Primary Examiner*—Hyung S. Sough
*Attorney, Agent, or Firm*—Watson Cole Grindle Watson, P.L.L.C.

[57] ABSTRACT

A bus-bar conductor system for electrical high voltage systems, wherein electrically conducting bus-bars are mounted in an enclosing compartment. A common support body for supporting one or more supporting insulators, to which the bus-bars are attached, extends freely or essentially freely in the compartment in the longitudinal direction of the bus-bars. The support body is preferably supported by support elements arranged at the outer ends of the compartment. The support body can itself be designed as a conducting bus-bar.

18 Claims, 6 Drawing Sheets

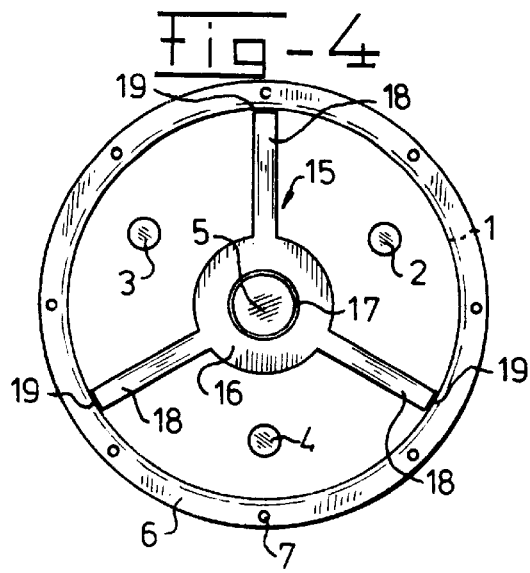
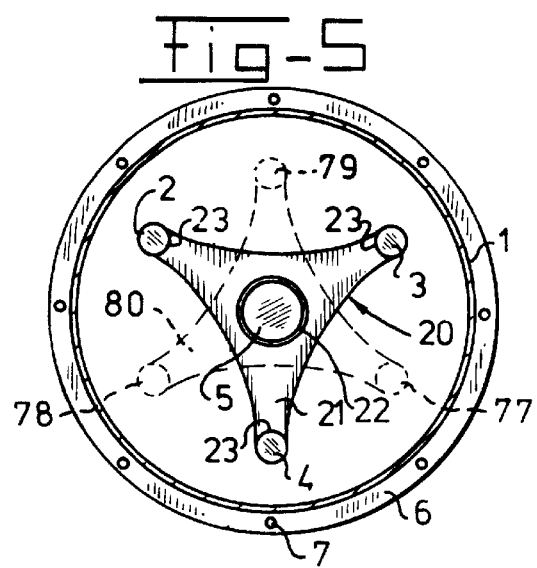
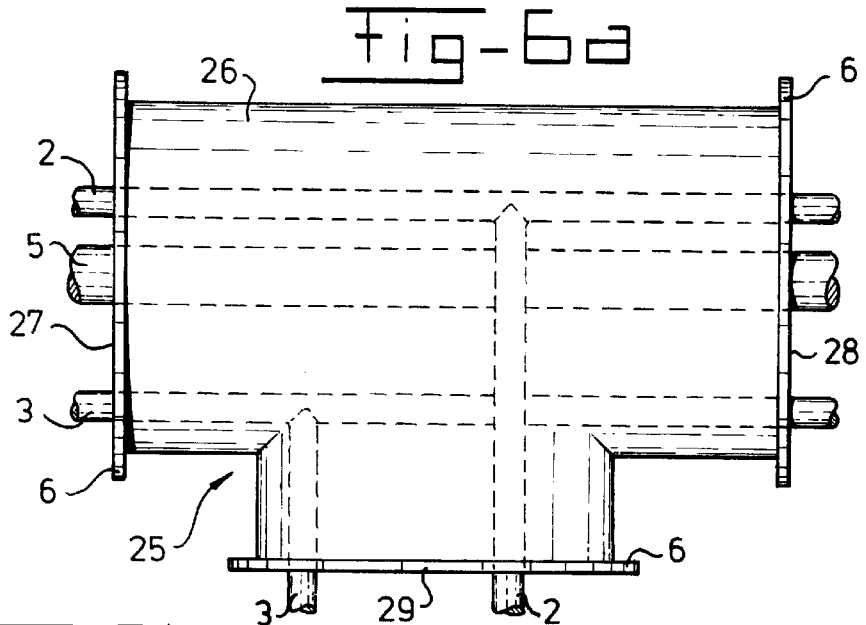
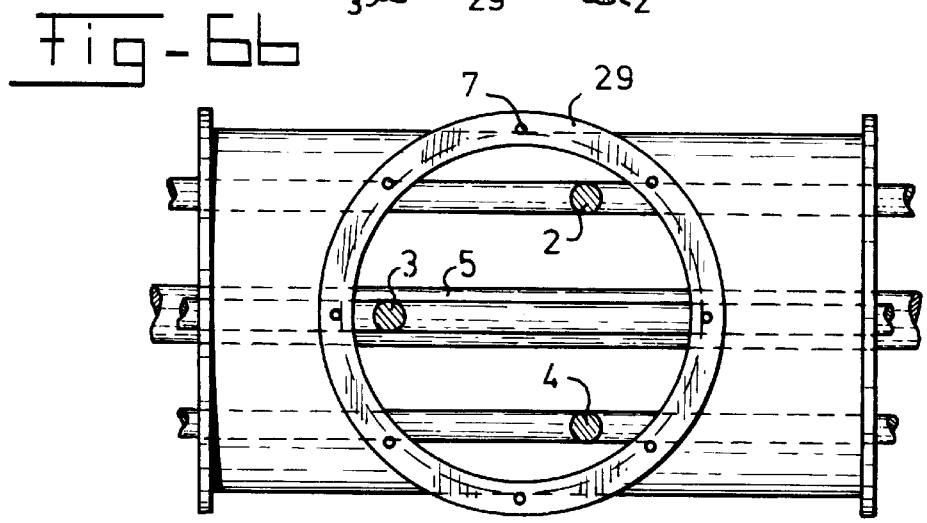

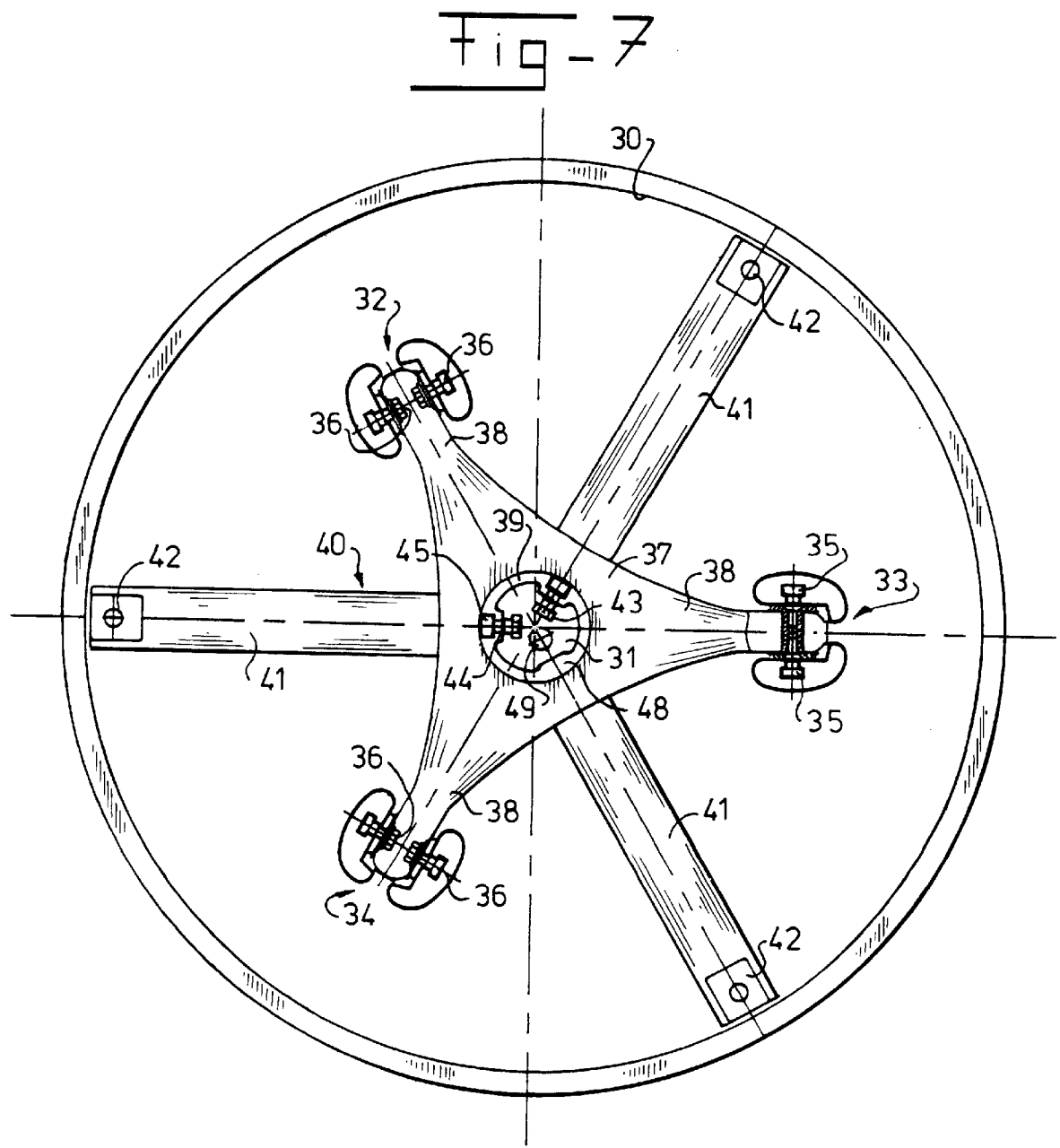

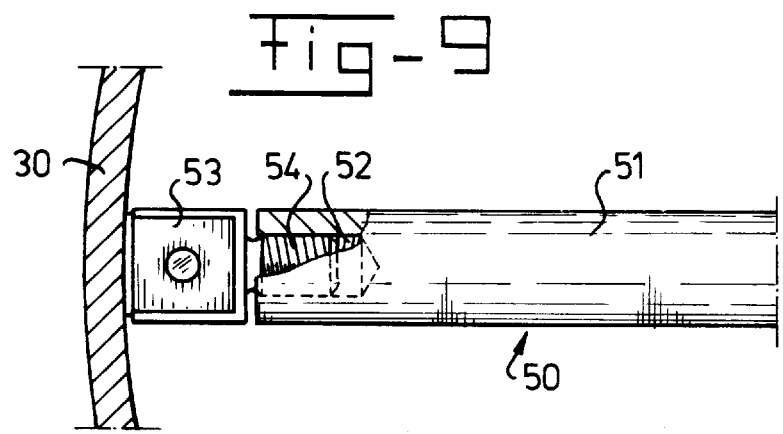
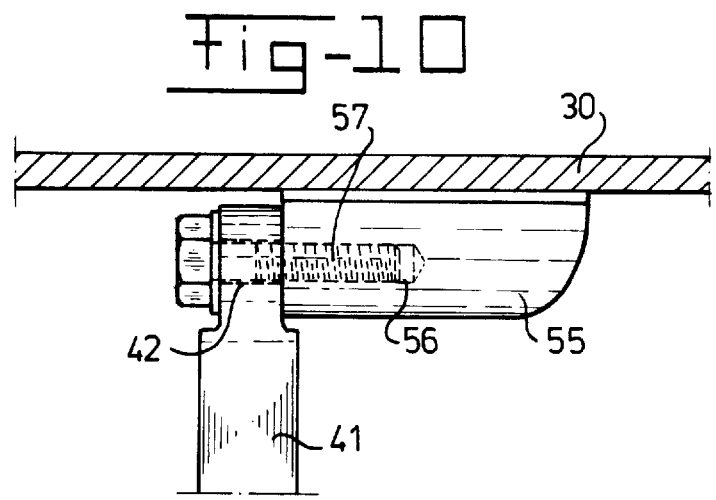
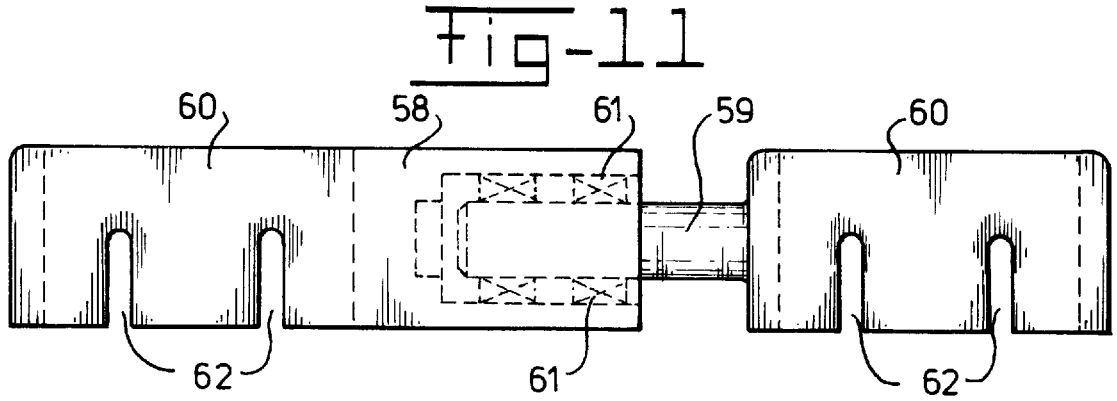

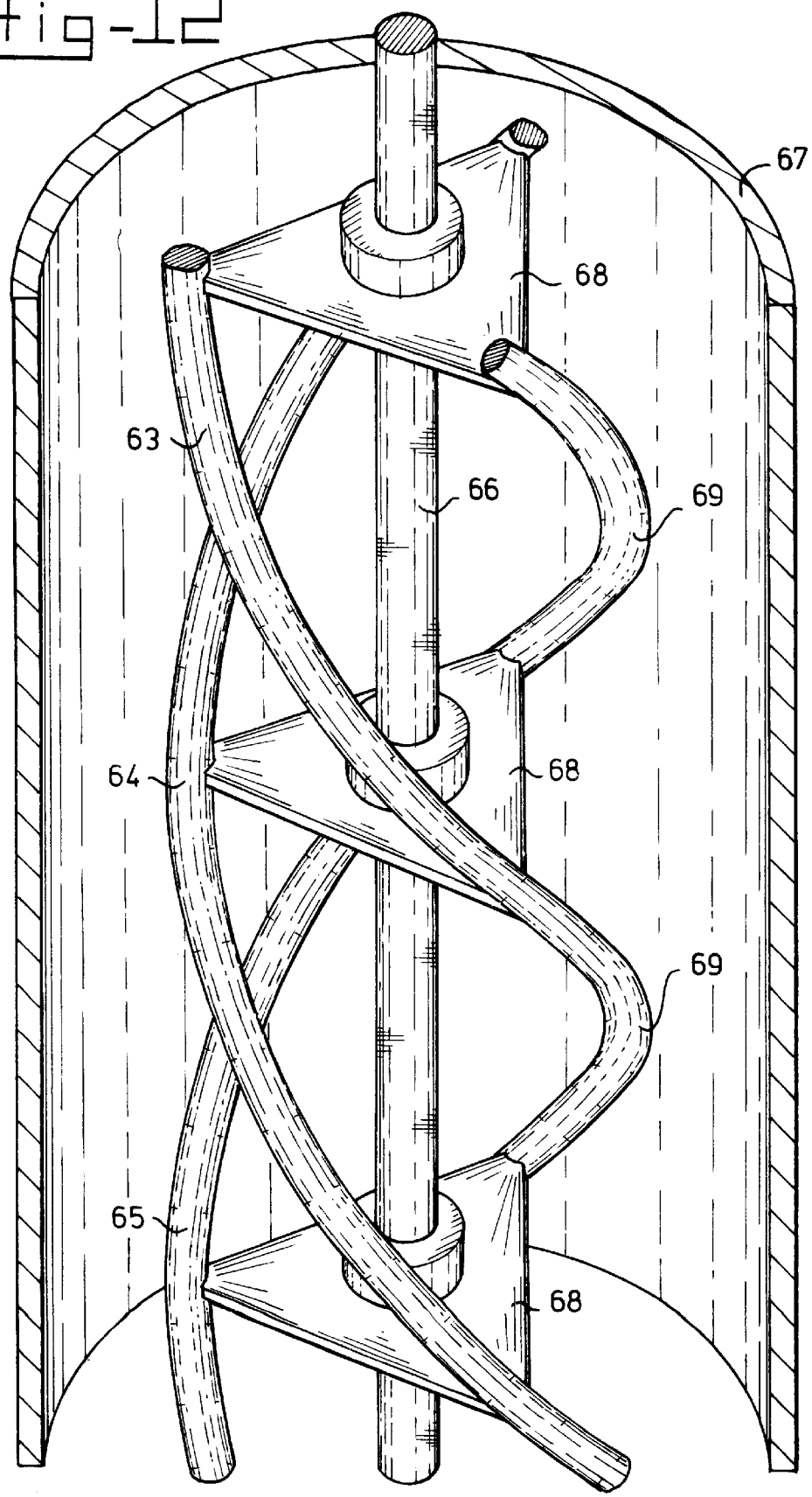

BUS-BAR CONDUCTOR SYSTEM FOR HIGH VOLTAGE SYSTEMS

BACKGROUND OF THE INVENTION

The invention relates to a bus-bar conductor system for electrical high voltage systems, comprising at least one electrically conducting bus-bar which is mounted, by means of at least one supporting insulator, in a compartment which encloses the at least one bus-bar.

Enclosed bus-bar conductor systems of this type are used in high voltage systems of the so-called closed type, wherein the components which are under voltage being protected against outside influences by means of an enclosure. This is, in particular, advantageous in areas where there are unfavourable environmental conditions (dust, moisture, salt and the like), as a result of which periodic maintenance, in the sense of cleaning of the bus-bar system and protection of the system against corrosion, is not necessary. A closed construction also offers an intrinsically safe solution for operators and maintenance personnel because inadvertent contact with components under voltage is not possible. In the case of an enclosure of electrically conducting material, there will also be no interfering effect, such as high frequency (HF) interference induced by switching phenomena, exerted on the environment. By using a suitable gaseous insulating medium, such as, for example, $SF_6$ gas, which is known per se, it is possible to achieve a reduction in the system dimensions compared with the so-called open systems, in which the bus-bar system is set up in, for example, the open air.

Enclosed bus-bar systems for the connection of, for example, disconnectors, circuit breakers, cable terminations, earthing switches and voltage and current transformers, in which systems the bus-bars are supported by supporting insulators mounted in the enclosing compartment and attached thereto, are disclosed in, inter alia, German patent 535,342; German patent application 3,119,915; U.S. Pat. Nos. 2,469,073, 2,815,396, 2,877,289, 2,973,405, 3,170,030 and Netherlands patent application 77,04276.

From an assembly point of view, a supporting structure of this type is less than optimal. In the case of compartments which have a relatively small cross-section, problems arise when attaching the supporting insulators to these compartments and the bus-bar, especially in the case of elongated compartments, where several supporting insulators have to be mounted distributed over the length of the compartment in order to provide a mechanically robust construction for absorbing mechanical forces exerted on the bus-bars by short circuits. In general, the more supporting insulators used to support the bus-bar system the larger is the permissible short circuit current in the system.

The mutual alignment of the supporting insulators in a compartment, in order to provide a support for the conducting bus-bars which as far as possible is free from mechanical stress and, especially in the case of a metal compartment, to guarantee a certain minimum spacing between the bus-bars and the walls of the compartment constitutes another assembly problem. It is also necessary to compensate for discrepancies in the dimensions and shape of the compartment by means of the supporting insulators.

The assembly disadvantages associated with the use of such separately mounted supporting insulators are multiplied in the case of three-phase high voltage systems, in which each phase bus-bar is disposed in the compartment by means of one or more individual supporting insulators. In order to be able to make optimum use of the available space, an additional requirement is that the mutual arrangement of the bus-bars must as far as possible be symmetrical.

Consequently, in practice, only relatively short compartments can be used, it being necessary to couple several compartments to one another, or to use compartments composed of segments, in order, for example, to bridge relatively long distances.

SUMMARY OF THE INVENTION

The object on which the invention is based is to provide an enclosed bus-bar system for use in high voltage systems, which bus-bar system can be mechanically and electrically simply sized and assembled, irrespective of the number of bus-bars or supporting insulators or the shape and dimensions of the compartments.

According to the invention this object is achieved in that the at least one supporting insulator is supported by a common support body which extends freely or essentially freely in the compartment in the longitudinal direction of the at least one bus-bar.

The invention is based on the insight that, from an assembly point of view, it is more advantageous to support the individual supporting insulators by means of a common support body extending in the compartment rather than by the compartment itself. The entire system comprising the support body, supporting insulators and bus-bar(s) according to the invention can be assembled outside the compartment with the desired mechanical accuracy, after which the assembled system can be positioned in the compartment.

Instead of means for fixing the various supporting insulators to the compartment and the bus-bars according to the prior art, with the present invention it is consequently necessary only to provide means for supporting the common support body, which means can be mounted inside or outside the compartment. In the latter case, the support body extends freely in the compartment. When mounted inside the compartment, the means for supporting the common support body are preferably positioned near the outer ends of the compartment, such that they are readily accessible and can be easily mounted. In this case, the support body extends essentially freely in the compartment.

In addition to advantages from an assembly point of view, the bus-bar system according to the invention also has the advantage that the dimensions of the compartment and of the bus-bar system can be matched to one another in an optimum manner with respect to the insulating medium used, for example $SF_6$ gas, and the nominal operating voltage of the bus-bar system, or the electrical installation in which it is used, without having to take account of fixing means individually mounted in the compartment for the individual supporting insulators.

Furthermore, in the bus-bar system according to the invention the permissible short circuit current load can easily be increased within specific limits by providing the common support body with more supporting insulators, without the compartment itself previously having to be provided with fixing means or previously having to be made suitable for this purpose.

In a preferred embodiment of the bus-bar system according to the invention, the compartment is cylindrical, the common support body extending in the longitudinal direction of the cylinder, the support body being supported by support elements mounted near the outer ends of the compartment.

In this case use is made of the fact that the bus-bar compartments are provided at the outer ends with suitable fixing means, such as, for example, flanges or the like, for connecting the compartments to one another or to other compartments of a particular electrical installation. Consequently, the outer ends of the compartments are relatively accurate in respect of shape and dimensions and in this embodiment of the invention use is advantageously made of this by supporting the common support body near the outer ends of the compartment.

In an embodiment of the bus-bar system according to the invention which is particularly suitable for cylindrical compartments of circular cross-section, the common support body is a shaft which extends in the compartment, the support elements for the shaft comprising fixing arms which extend transversely to the longitudinal direction of the shaft and with one end engage on the compartment and with the other end on the shaft, or on an element provided with a passage for the shaft.

In order to be able to compensate for any tolerance and deviations in shape in the compartment, the fixing arms and/or the common support body and in order to position the common support body in a desired position, for example centrally in the compartment, in yet a further embodiment of the invention one or more of the fixing arms of the support elements for the common support body are designed to be adjustable in their longitudinal direction, for example by means of a screw thread connection.

If, for example, $SF_6$ gas is used as the insulating medium, the temperature of the common support body will be no higher, or barely higher, than the maximum permissible temperature for the insulating medium, which in practice is a maximum of about 60° C. The temperature of the conductors can, however, rise to about 100° C. during operation as a consequence of the electric current passing through the conductors.

These temperature differences can give rise to a mechanical force acting in the bus-bar system as a result of differences in expansion of the bus-bar or bus-bars and the common support body.

In yet a further embodiment of the invention changes in the length of the bus-bar or bus-bars with respect to the common support body can easily be compensated for in that the at least one supporting insulator is mounted to the common support body such that it is movable in the longitudinal direction of the at least one bus-bar. Of course, if desired, the support body itself can also be mounted in the compartment so that it is movable in the longitudinal direction. It will be clear that the movable insulators provide a bus-bar system which mechanically is significantly simpler to construct than, for example, the bus-bar system marketed by Applicant under the name TRISEP system, in which the supporting insulators are fixed in the compartment so that they can swing in the longitudinal direction of the bus-bars. Moreover, the common support body can be produced from a material which has a relatively low coefficient of thermal expansion. Further suitable materials, in addition to metal, are plastics, if necessary weakly electrically conducting plastics, which, like a metal support, have the advantage that the wave impedance of the bus-bar system can be influenced by earthing these plastics, in order that as little wave energy as possible is transported through the bus-bar system as a consequence of transient phenomena due to switching operations and the like.

The common support body can also act as a conductor, either as a neutral conductor or a phase conductor. It will be understood that the support elements for supporting the support body in the compartment, especially when a compartment of electrically conducting material is used, must then also be made of electrically insulating material.

In an embodiment which is highly advantageous from an assembly point of view, the at least one supporting insulator is composed of an element of electrically insulating material provided with a passage for the common support body. Supporting insulators of this construction can easily be pushed over the support body. It will be clear that the fitting of more supporting insulators in order to increase the resistance of the bus-bar system to short circuiting is reduced to a simple operation by this means.

In the preferred embodiment of the bus-bar system according to the invention, the common support body is provided in its longitudinal direction with at least one undercut groove for receiving sliding nuts or sliding bolts, the support elements for supporting the common support body and one or more of the supporting insulators for supporting the at least one bus-bar being provided with mating bolts or nuts, respectively, for fixing the support elements and supporting insulators to the common support body by means of a screw thread connection.

Uniform fixing of the common support body to the compartment and of the insulators to the support body is possible in this way. In order effectively to absorb forces on the insulators in the axial direction of the common support body as a consequence of thermal expansion of the conductors and the support body, preferably only the supporting insulator located in the centre of the compartment is fixed to the support body, whilst the other supporting insulators are movably mounted on the support body. The phase conductors and the support body are now able to expand in both directions with respect to the firmly fixed supporting insulator. As a result of the axially movable mounting of the other supporting insulators, no forces are exerted on these in the axial direction of the bus-bar(s).

In order to achieve as accurate as possible mutually symmetrical mounting of the conductors in, for example, an electrical three-phase system and to prevent undesired mutual shifting of the conductors as a consequence of dynamic forces exerted thereon in the event of, for example, a short circuit current load, in a further embodiment of the invention the common support body and the passages in the support elements and the supporting insulators are provided with means for preventing mutual rotation. An effective locking against rotation can be achieved by means of mutually matching ridges and grooves, for example a flattened groove made at the circumference of the common support body and a ridge of corresponding dimensions made in the passage in the supporting insulators.

Especially for three-phase applications, it is advantageous to position the common support body centrally in the compartment and to arrange the conductor bus-bars symmetrically around the central support body mutually spatially offset over 120°. An arrangement of this type makes maximum use of the available space with respect to the electrostatic loading.

The central arrangement of the support body in the compartment is in no way a necessary precondition. The support body can also be mounted displaced towards the wall of the compartment, in which case the bus-bars extend alongside one another in the compartment. An arrangement of this type is advantageous in the case of branching of the bus-bar system, in which case it is possible to maintain a desired phase sequence, and for connection to other components of an electrical installation, such as disconnectors, circuit breakers, cable terminations and the like. Conductor bus-bars arranged alongside one another are known per se from the applicant's TRISEP® system, mentioned above.

In order to enable branching in a bus-bar conductor system in which the bus-bars are arranged mutually spatially offset over 120°, with retention of a desired phase sequence, in one embodiment of the invention the bus-bars are arranged in spiral or helical form around the common support body.

Viewed from the circumference of the compartment, the various phase bus-bars, which as a consequence of their spiral arrangement are successively adjacent in the axial direction of the support body, can then be branched in a single line for connection to a bus-bar system having adjacently arranged conductor bus-bars as discussed above.

For example, conductor systems belonging to different electrical circuits can also be arranged in a single compartment, which conductor systems can be supported by a single common support body, or to which end a separate support body can be fitted in the compartment for each conductor system, in accordance with the inventive concept.

Furthermore, the common support body can be provided with a channel or opening in the longitudinal direction, which channel or opening is intended to receive, for example, measuring cables or other signalling cables, which can be connected to transducers or current and voltage measuring elements arranged in the compartment. These measuring or signalling cables can easily be fed outside the compartment via the support body and, if necessary, the support elements.

The invention will be explained in more detail below with embodiments illustrated by figures.

BRIEF DESCRIPTION OF THE DRAWINGS

FIGS. 4 and 5 show cross-sectional views, corresponding to FIGS. 2 and 3, of, respectively, a support element and a supporting insulator for use in a bus-bar conductor system of the construction according to the invention.

FIGS. 6a and 6b show, schematically, a T-branch element for use in the bus-bar conductor system according to FIG. 1.

FIG. 7 shows, schematically, a cross-sectional view of a preferred embodiment of the bus-bar conductor system according to the invention.

FIG. 9 shows, schematically, part of a support element for supporting the support body, which support element is adjustable in its longitudinal direction.

FIG. 10 shows, schematically, a fixing of a support element to the compartment.

FIG. 11 shows, schematically, a sliding electrical contact for electrically and mechanically coupling bus-bars of adjacently arranged compartments.

FIG. 12 shows, schematically, a longitudinal sectional view of a three-phase bus-bar conductor system according to the invention, wherein the bus-bars are spiralled around the common support body.

DETAILED DESCRIPTION OF THE EMBODIMENTS

Figure 1:
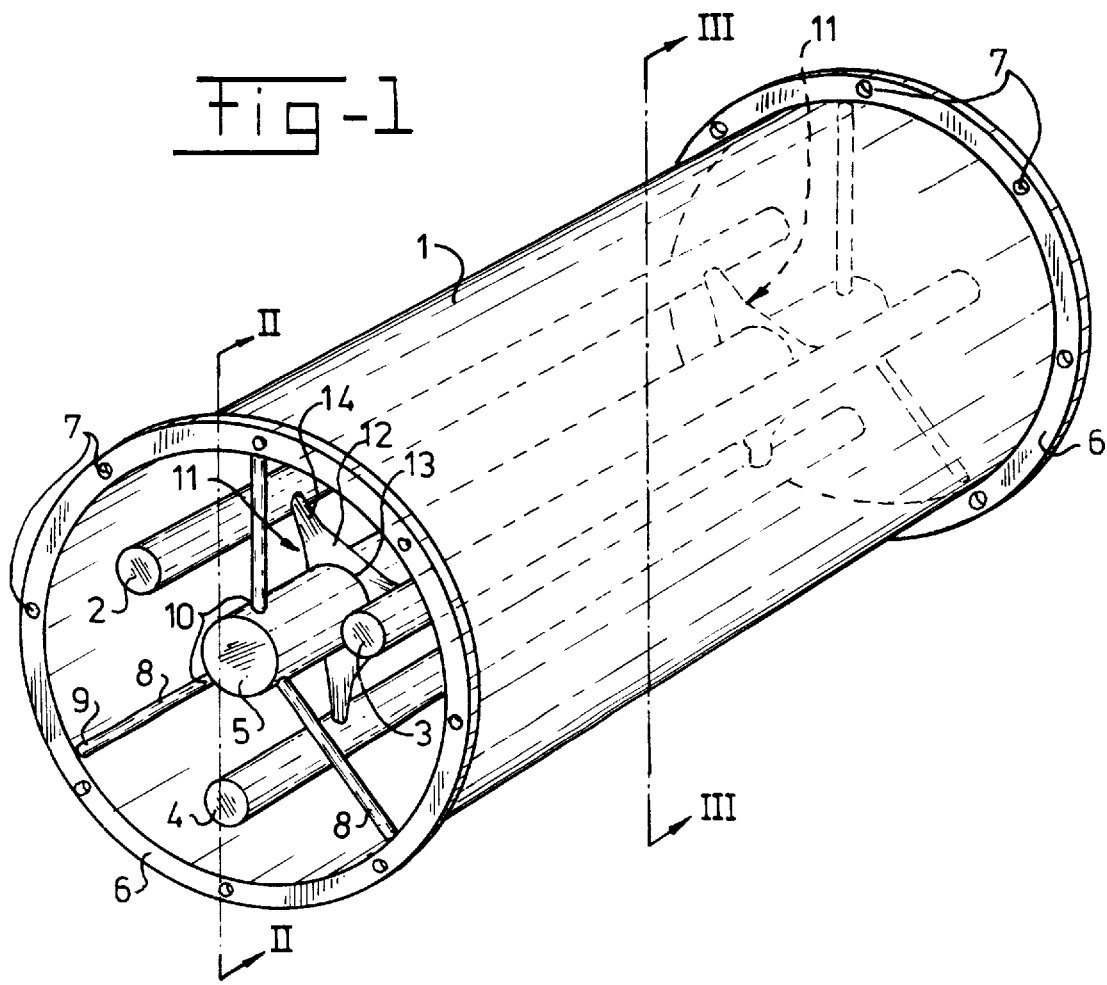
FIG. 1 shows schematically a perspective view of one embodiment of the bus-bar conductor system according to the invention for use in an electrical three-phase high voltage system.

In FIG. 1 reference numeral 1 indicates an elongated cylindrical compartment 1 of circular cross-section, in which compartment three electrically conducting bus-bars 2, 3, 4 extend in the longitudinal direction. The bus-bars 2, 3, 4 are mutually symmetrically spatially distributed over 120° around an elongated common support body 5, which support body 5 likewise extends longitudinally in the compartment 1, parallel to the bus-bars 2, 3, 4.

The compartment 1 is provided at its ends with flanges 6 which have openings 7 for coupling several compartments 1 in their longitudinal direction. Three fixing arms 8, which with one end 9 engage on the inside wall of the compartment 1 and with the other end 10 engage on the support body 5, are mounted in the compartment 1, at the location of the flanges 6. In the embodiment shown the support body 5, which is in the form of a shaft, is positioned centrally in the compartment with the aid of the fixing arms 8.

Two supporting insulators 11 are shown offset in the longitudinal direction of the support body 5, which supporting insulators 11 are supported by the support body 5. With their free ends, the supporting insulators 11 support the bus-bars 2, 3, 4.

It can clearly be seen from FIG. 1 that the common support body 5 extends freely in the compartment 1 between, viewed in the longitudinal direction, successive fixing arms 8 and acts as support body for the supporting insulators 11 for supporting the bus-bars 2, 3, 4.

The assembly comprising the support body 5, the supporting insulators 11, the bus-bars 2, 3, 4 and, if desired, the fixing arms 8, can be assembled outside the compartment 1 and then introduced into the compartment, after which only the fixing arms 8 at the outer ends of the compartment 1 have to be coupled thereto or otherwise supported. This presents no problems from an assembly point of view, because the ends of the compartment are readily accessible, in contrast to the embodiments according to the prior art in which several supporting insulators, in principle separately for each bus-bar 2, 3, 4, have to be fixed inside the compartment 1.

By mounting the fixing arms 8 for the support body 5 near the flange edges 6, use is advantageously made of the relatively accurate sizing of the flanges 6, in contrast to the compartment 1 itself, which in practice is produced with relatively fairly large tolerances, which has a direct effect on the symmetry of a bus-bar system supported, according to the prior art, at various positions on the wall of the compartment 1. In order to correct these asymmetries it is necessary to adjust the supporting insulators themselves or their mounting, which in practice, in view of the relatively poor accessibility of the supporting insulators in compartments of this type, which have a diameter of 40–80 cm, is a fairly laborious and time-consuming operation.

In the bus-bar system according to the invention asymmetries in the compartment 1 can easily be compensated for by adjusting one or more of the fixing arms 8 for the support body 5, that is to say, not the individual supporting insulators 11, irrespective of the dimensions of the particular compartment. To this end, one or more of the fixing arms 8 can be designed to be adjustable in the longitudinal direction, for example in the form of a fixing arm 8 composed of two parts screwed into one another. It will be clear that, because of the relatively small number of fixing arms 8 to be adjusted, an adjustment of this type, should this be necessary, can be carried out more easily and, because these arms are readily accessible, more rapidly and more cheaply than can adjustment of several supporting insulators, which are difficult to reach, for several individual bus-bars in the compartment.

Figure 2:
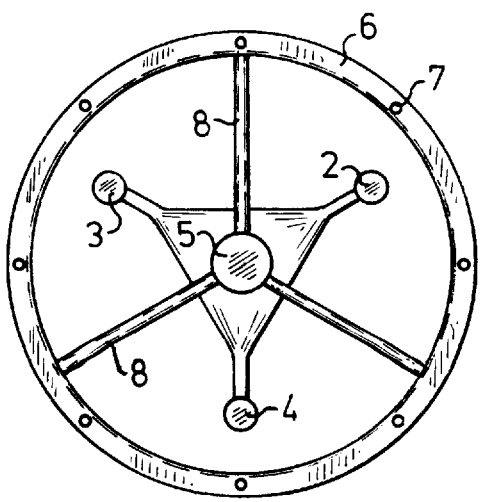
FIGS. 2 and 3 respectively show, schematically, a cross-section along the lines II—II and III—III in FIG. 1.

FIG. 2 shows a cross-section along line II—II in FIG. 1, the mutual positions of the support body 5, the bus-bars 2, 3, 4 and the fixing arms 8 for the support body 5 being clearly indicated.

Figure 3:
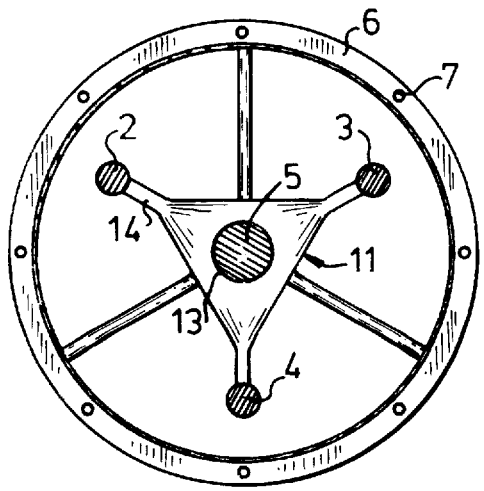

FIG. 3 shows a cross-section along the line III—III in FIG. 1, illustrating the shape of the supporting insulators 11. For the sake of clarity, the fixing arms 8 are not shown.

The supporting insulators 11 comprise a part 12 provided with a passage 13 and arms 14 which support the respective bus-bars 2, 3, 4.

FIG. 4, corresponding to FIG. 2, shows a further embodiment of a support element 15 for the support body 5, which support element 15 is composed of a part 16 provided with a passage 17 for the support body 5 and with fixing arms 18 extending from the part 16, which fixing arms firmly engage or clamp with their free end 19 onto the compartment 1.

FIG. 5, corresponding to FIG. 3, shows a further embodiment of a supporting insulator 20 for use in a bus-bar conductor system according to the invention, which supporting insulator 20 has a star-shaped part 21 provided with a passage 22, the bus-bars 2, 3, 4 being supported by the free ends 23 of the part 21.

FIGS. 6a and 6b show a so-called T-piece 25 for use with a bus-bar system according to FIG. 1, for branching the bus-bars 2, 3, 4.

FIG. 6a shows a view towards a T-shaped compartment 26 which has ends 27, 28 and 29. The bus-bars 2, 3, 4 extend between the ends 27 and 28 in a manner corresponding to that shown in FIG. 1. By branching the conductors 2, 3, 4 as shown, the symmetrical spatial distribution thereof at the exit can be retained, as is illustrated in the view towards the end 29 shown in FIG. 6b.

The bus-bars 2, 3, 4 can be made of copper, aluminium or any other suitable electrically conducting material, whilst the support body can be made of electrically insulating material, weakly electrically conducting material or likewise of copper or aluminium, if the support body 5 acts as an electrical conductor in the bus-bar system, for example as a neutral conductor or phase conductor. The compartment 1 can be produced in one piece from electrically conducting sheet metal, but can also be made up of segments. Electrically conducting material is to be preferred because of its shielding effect. However, the compartment can also be made of electrically insulating material, for example a suitable casting resin or plastic material.

In the case of compartments made of electrically conducting material, the support body 5 can be kept at the same potential, for example earth potential, as the compartment 1 by making one or more of the fixing arms 8 or the support element 15 of electrically conducting material. If the support body 5, as a bus-bar, itself forms part of the current circuit, it is preferable to make the fixing arms 8 or the support element 15 of electrically insulating material, which, of course, is necessary if in such a case the compartment 1 is made of electrically conducting material. The supporting insulators 11, 20 can be made of a suitable ceramic material, casting resin or plastic.

FIG. 7 shows a view corresponding to FIGS. 2–5 of a preferred embodiment of the bus-bar conductor system according to the invention. Reference numeral 30 indicates a cylindrical compartment of circular cross-section, in the centre of which a common support body 31 extends in the longitudinal direction of the compartment 30.

Three electrically conducting bus-bars 32, 33, 34 are arranged parallel to the support body 31 in the compartment 30, which bus-bars 32, 33, 34 each consist of two rods provided with a longitudinal groove 35 in which bolts 36 engage, by means of which the conductors 32, 33, 34 are fixed to the free ends 38 of a supporting insulator 37. See the above-mentioned Netherlands patent application 77,04276 for a more detailed description of the bus-bars 32, 33, 34.

The supporting insulator 37 is provided with a passage 39, by means of which this insulator is fitted over the support body 31. The support body 31 is supported in the compartment 30 by means of a support element 40. The support element 40 is provided with fixing arms 41, which at their free ends have an opening 42 for fixing these arms, for example via a bolt connection, to lips or similar mountings provided on the compartment 30 close to its ends, see FIG. 10.

Figure 8:
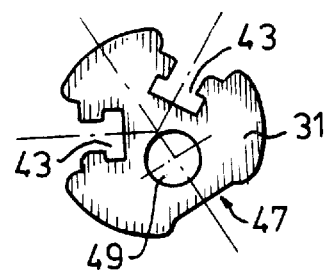
FIG. 8 shows, schematically, on an enlarged scale, a transverse view of the support body according to FIG. 7.

As is shown on an enlarged scale in FIG. 8, the support body 31 is provided with two undercut grooves 43 in the longitudinal direction. In the assembled state, as shown in FIG. 7, bolts 44 are fitted in the grooves 43, which bolts engage in parts 45, which are constructed as nuts, of the support element 40 and the supporting insulator 37. The supporting insulators 37 can be fixed to the support body 31 outside the compartment 30 by means of a bolt/nut connection of this type, whilst the support body 31 can then also be adjustably fixed with the support element 40 to the compartment 30 in this way. For reasons of saving in weight, the supporting insulator 37 can also be provided with suitably arranged openings or recesses. It will be understood that the bolts 44 and nuts 45 can also be used mutually interchanged, that is to say a sliding nut can be incorporated in the grooves 43, whilst the supporting insulator 37 and the support element 40 are provided with bolts.

In the enlarged view of the support body 31 as shown in FIG. 8 it can be seen that this support body is provided at the circumference with a flattened groove 47, in which ridge 48 of corresponding shape in the passage 39 of the insulator 37 engages. The reason for this is to prevent rotation of the supporting insulator 37 with respect to the support body 31. In this case also the support body 31 can conversely be provided with a ridge and the supporting insulator 37 with a groove.

Reference numeral 49 indicates a channel formed in the longitudinal direction in the support body 31 for receiving measuring cables or other signalling cables for the connection of transducers, for example capacitive voltage transducers or other voltage or current measurement means, current transformers, optical sensors for detecting discharge arcs and the like in the compartment 30. At the position of these transducers, the support body is provided with a hole for feeding the wiring to the transducers. At the end of a compartment or a series of compartments an element of casting resin may be provided in which an outwardly accessible wiring is imbedded to which the wiring inside the compartment(s) is connected.

FIG. 9 shows, schematically, part of a support element 50, for supporting a support body, for example the support body 31 shown in FIG. 7, which support element 50 having a fixing arm 51. One end of the fixing arm 51 engages the support body (not shown) whereas its other end is provided with internal screw thread 52 for coupling to a mounting part 53, having mating outer screw thread 54, which mounting part 53 is fixed to the compartment, for example the compartment 30 shown in FIG. 7. By more or less screwing the threaded parts 52, 54 together, the length of the support element 50 can be varied, such to compensate for tolerance and shape deviations of the compartment, in order to position the common support body centrally in the compartment, if desired. It will be understood that the screw threaded parts can be provided in a complementary manner or in that other suitable techniques for providing a longitudinally adjustable support element may be used, such as a locking, sliding coupling of the arm 51 and the mounting part 53. Although all of the arms of a support element may be adjustable, in practice it generally suffices if at least two of the arms are adjustable in their longitudinal direction.

With the arrangement shown in FIG. 9 large distances can be adjusted. However, in practice generally small deviations have to be corrected which can be provided for by the manner of fixing of the arms to the compartment as shown in FIG. 10, for example.

Fixing elements 55 are welded to the internal wall of the compartment 30, shown in FIG. 7, at the ends thereof. These fixing elements 55 have internal screw thread 56 for receiving a bolt 57 by which an fixing arm 41 is connected to the fixing element 55. By having the diameter of the openings 42 at the free ends of the arms 41 larger than the diameter of the bolt 57, or by providing a slotted opening 42, for example, the arm 41 can be easily adjusted in its longitudinal direction.

FIG. 11 shows, schematically, a sliding electrical contact assembly for electrically and mechanically coupling bus-bars of adjacently arranged compartments.

The contact assembly shown comprises a female part 58 and a mating male part 59, each of which having a mechanical coupling part 60 for coupling to the end of a bus-bar, such as the bus-bars 32, 33, 34 shown in FIG. 7. In the female part 58 contact elements 61 are provided, for slidably engaging the male part 59. The mechanical coupling parts 60 are provided with slots 62 which, when mounted to a bus-bar, engage at the inner side of the bus-bar and receive the bolts 36 by means of which the bus-bars 32, 33, 34 are fixed to the free ends 38 of the supporting insulator 37, see FIG. 7. With this slidable contact assembly axial displacement of the bus-bars due to thermal expansion/contraction thereof is not impeded.

Figure 13:
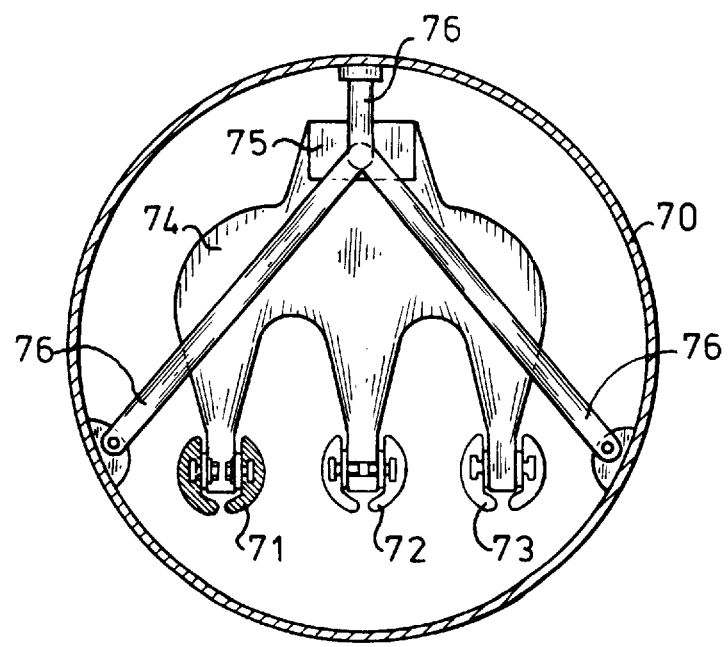
FIG. 13 shows, schematically, a cross-sectional view of a further embodiment of the bus-bar conductor system according to the invention.

For straight line branching, for example, of the bus-bars 32, 33, 34, which are arranged symmetrically around the support body 31, as is shown, for example, in FIG. 7, or for connecting a bus-bar system of this type to the bus-bar system shown in FIG. 13, the bus-bars can advantageously be arranged in spiral or helix form around the support body, for which purpose the method of support according to the invention is particularly suitable, partly because the number of supporting insulators can be arbitrarily chosen in order to obtain a bus-bar fixing which is mechanically sufficiently robust effectively to absorb mechanical forces acting thereon in, for example, short circuit current situations. In the case of such a bus-bar system arranged in spiral form, the bus-bars can be branched in any desired sequence in a straight line, viewed from the circumference of the compartment, or arranged alongside one another.

FIG. 12 shows, schematically, an impression of a three-phase bus-bar conductor system according to the invention, wherein bus-bars 63, 64, 65 are spiralled around a common support body 66 positioned in a compartment 67, partly shown. The bus-bars 63, 64, 65 are fixed to the common support body or shaft 66 by means of supporting insulators 68. Reference numerals 69 indicate positions of the bus-bars 63, 64, 65 at which they can be branched in a straight or single line for connection to a bus-bar conductor system having adjacently arranged bus-bars, as shown in FIG. 13 for example.

FIG. 13 shows an alternative embodiment of the bus-bar conductor system according to the invention, in which electrically conducting bus-bars 71, 72, 73 are arranged parallel alongside one another in a compartment 70. The bus-bars are mounted on a supporting insulator 74, which, in turn, is supported by an elongated support body 75 extending in the longitudinal direction of the compartment 70. In contrast to the above embodiments, the support body 75 is mounted off-centre in the compartment 70 by means of fixing arms 76.

As is suggested by broken lines in FIG. 5, in addition to the bus-bars 2, 3, 4 further bus-bars 77, 78, 79, supported by a supporting insulator 80, can also extend in the compartment 1. The bus-bars 77, 78, 79 can belong to a different circuit than the bus-bars 2, 3, 4. The supporting insulator 80 can be supported by the same support body as the supporting insulator 20. Of course, embodiments are also possible in which the bus-bar systems 2, 3, 4 and 77, 78, 79 are arranged off-centre in the compartment 1 and each supported by their own support body, according to the invention (not shown), of course insofar as this is not impeded by the fixing arms 8; 18; 41.

The bus-bar system according to the invention can be used up to very high nominal voltages. In combination with a suitable insulating medium, such as, for example, $SF_6$ gas, nominal voltages of 245 kV are permissible. Depending on the gas density even higher nominal voltages are permissible.

The invention is, of course, not restricted to applications in three-phase systems, as shown in the figures, but can also be used for single phase or two-phase electrical circuits or combinations of separate single phase electrical circuits and/or multi-phase circuits. The enclosing compartment can be of any suitable shape, and thus also rectangular, square, elliptical, etc. and can be made up of segments.

The support elements or arms for positioning the support body in the compartment can, in contrast to the arrangement shown, also be fixed outside the compartment to, for example, a chassis or frame of the high voltage system or a component used therein (switch, disconnector, etc.) or can form part thereof. Essentially any suitable mechanical construction can be used as support element for the support body.

I claim:

1. A bus-bar conductor system for electrical high voltage systems, comprising housing means defining two outer ends and forming an elongated, longitudinally enclosed compartment, an elongated electrically-conducting bus-bar which extends within said compartment, an elongated common support body which extends freely within and along a longitudinal direction of said compartment, a common supporting insulator which mounts said bus-bar on said elongated common support body; and a plurality of support elements mounted on the elongated common support body and extending from the elongated common support body to the housing means to support said elongated common support body within the housing means.

2. A bus-bar conductor system according to claim 1, wherein the elongated common support body is a shaft which extends in the compartment, wherein the support elements for the shaft comprise fixing arms which extend transversely to a longitudinal direction of the shaft, one end of each of said fixing arms engaging the housing means and another end engaging the shaft.

3. A bus-bar conductor system according to claim 1, wherein the elongated common support body is a shaft which extends in the compartment, the support elements for the shaft comprising fixing arms which extend transversely to a longitudinal direction of the shaft and with one end engaged on the housing means and with the other end on an element provided with a passage for the shaft.

4. A bus-bar conductor system according to claim 1, wherein the support elements for the elongated common support body comprise fixing arms which extend transversely to the longitudinal direction of the elongated common support body, said fixing arms being adjustable in a longitudinal direction of said fixing arms.

5. A bus-bar conductor system according to claim 1, wherein the common supporting insulator is mounted to the elongated common support body so as to be movable in the longitudinal direction of the bus-bar.

6. A bus-bar conductor system according to claim 5, wherein the common supporting insulator is composed of an element of electrically insulating material provided with a passage for the elongated common support body.

7. A bus-bar conductor system according to claim 1, wherein the elongated common support body is provided in its longitudinal direction with at least one undercut groove for receiving sliding nuts or sliding bolts, the support elements for supporting the elongated common support body and the common supporting insulator for supporting the bus-bar being provided with mating bolts or nuts, respectively, for fixing the support elements and common supporting insulator to the elongated common support body by means of a screw thread connection.

8. A bus-bar conductor system according to claim 1, wherein the elongated common support body, the support elements and the common supporting insulator are provided with means for preventing mutual rotation.

9. A bus-bar conductor system according to claim 1, wherein mating ridges and grooves of matching shape are provided at a circumference of the elongated common support body and in passages of the support elements and the common supporting insulator for receiving the elongated common support body.

10. A bus-bar conductor system according to claim 1, including three electrically conducting bus-bars for a three-phase high voltage system, wherein the elongated common support body is mounted centrally in the compartment and the bus-bars are positioned rotationally symmetrically around the elongated common support body mutually spatially offset over 120°.

11. A bus-bar conductor system according to claim 11, wherein the bus-bars extend in spiral form around the elongated common support body.

12. A bus-bar conductor system according to claim 1, including several electrically conducting bus-bars belonging to separate electrical circuits, the bus-bars being supported in the compartment by said elongated common support body.

13. A bus-bar conductor system according to claim 12, wherein the bus-bars are provided on one or more ends thereof with sliding contacts for axial coupling of bus-bars of adjacently arranged compartments.

14. A bus-bar conductor system according to claim 1, wherein the elongated common support body includes a channel extending in the longitudinal direction of the elongated common support body.

15. A bus-bar conductor system according to claim 14, including measuring means in the compartment end and connected to measuring cables which are fed via the channel in the elongated common support body to the outside of the compartment.

16. A bus-bar conductor system according to claim 1, wherein the elongated common support body is made of an electrically conducting material.

17. A bus-bar conductor system according to claim 1, wherein the plurality of support elements is arranged near the outer ends of the housing means.

18. A bus-bar conductor system according to claim 1, wherein the elongated common support body is mounted in the compartment so as to be movable in the longitudinal direction of the compartment.

* * * * *

UNITED STATES PATENT AND TRADEMARK OFFICE
CERTIFICATE OF CORRECTION

PATENT NO. : 5,811,734
DATED : September 22, 1998
INVENTOR(S) : Ysbrand Paul Jozef Maria Ponsioen It is certified that error appears in the above-identified patent and that said Letters Patent is hereby corrected as shown below:

On the title page, insert item [73]:

[73] Assignee: Elin Holec High Voltage B.V.
Amersfoort, Netherlands

Signed and Sealed this

Twenty-ninth Day of August, 2000

Attest:

Q. TODD DICKINSON

*Attesting Officer*     *Director of Patents and Trademarks*